US012602957B2

(12) United States Patent
Maeng

(10) Patent No.: US 12,602,957 B2
(45) Date of Patent: Apr. 14, 2026

(54) SERVER, SYSTEM, AND METHOD FOR PROVIDING ENERGY EFFICIENCY MANAGEMENT SERVICE

(71) Applicants: Hyundai Motor Company, Seoul (KR); Kia Corporation, Seoul (KR)

(72) Inventor: Cheon Maeng, Seoul (KR)

(73) Assignees: Hyundai Motor Company;, Seoul (KR); Kia Corporation, Seoul (KR)

(*) Notice: Subject to any disclaimer, the term of this patent is extended or adjusted under 35 U.S.C. 154(b) by 131 days.

(21) Appl. No.: 18/587,156

(22) Filed: Feb. 26, 2024

(65) Prior Publication Data

US 2025/0273024 A1 Aug. 28, 2025

(30) Foreign Application Priority Data

Dec. 27, 2023 (KR) ........................ 10-2023-0192988

(51) Int. Cl.
*G07C 5/08* (2006.01)

(52) U.S. Cl.
CPC ......... *G07C 5/0825* (2013.01); *G07C 5/0808* (2013.01)

(58) Field of Classification Search
CPC .... G07C 5/0808; G07C 5/0825; G07C 5/008; G07C 5/0816; B60R 16/023; H04L 67/12
See application file for complete search history.

(56) References Cited

U.S. PATENT DOCUMENTS

2014/0236467 A1* 8/2014 Liu ........................... B60L 3/12 701/123
2016/0086390 A1* 3/2016 Berkobin ............... G07C 5/008 701/1
2023/0154250 A1 5/2023 Jiang et al.

FOREIGN PATENT DOCUMENTS

JP 2004218558 A * 8/2004 ......... F02D 41/1448
JP 2014013522 A * 1/2014 ............... B60K 6/48
JP 2019-001449 1/2019
JP 2020-114127 7/2020
JP 2022-027238 2/2022
JP 2022-055623 4/2022
KR 10-2023-0066914 5/2023
TW 201434694 A * 9/2014

* cited by examiner

*Primary Examiner* — Rufus C Point
(74) *Attorney, Agent, or Firm* — MORGAN, LEWIS & BOCKIUS LLP

(57) ABSTRACT

An energy efficiency management service providing server may include a communication module configured to communicate with external devices, and a processor operatively connected to the communication module and configured to determine per-electronic component energy consumption ratios relative to battery energy consumed over a predetermined time period based on energy efficiency-related data of a vehicle, determine a driving pattern type based on the per-electronic component energy consumption ratios, and generate an energy efficiency improvement guide based on the driving pattern type.

19 Claims, 10 Drawing Sheets

SERVER, SYSTEM, AND METHOD FOR PROVIDING ENERGY EFFICIENCY MANAGEMENT SERVICE

CROSS-REFERENCE TO RELATED APPLICATION

The present application claims priority to Korean Patent Application No. 10-2023-0192988, filed Dec. 27, 2023, the entire contents of which is incorporated herein for all purposes by this reference.

BACKGROUND OF THE PRESENT DISCLOSURE

Field of the Present Disclosure

The present disclosure relates to a service for managing energy efficiency of a vehicle, and more particularly, to an energy efficiency management service providing server for providing energy efficiency improvement guides based on an analysis of the energy consumption ratio of an electric vehicle, an energy efficiency management service providing system including the server, and an energy efficiency management service providing method of the system.

Description of Related Art

Conventional vehicle systems display the energy efficiency of a vehicle to the driver in the form of an energy efficiency value (km/kWh) based on the energy consumed and driving distance.

The conventional energy efficiency display method varies according to the display mode, presenting either the real-time instantaneous energy efficiency value calculated while driving, the average energy efficiency calculated after charging a specific amount of energy, or the accumulated energy efficiency value calculated over a specific driving distance.

The conventional energy efficiency display method simply allows the driver to grasp the energy efficiency of the vehicle without additional information on driving behaviors which may have affected to energy efficiency value.

Therefore, the conventional energy efficiency display method does not provide guidance for the driver to take actions to improve energy efficiency, missing the chances of tangible energy efficiency improvement.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an energy efficiency management service providing server, an energy efficiency management service providing system including the server, and an energy efficiency management service providing method of the system that are configured for guiding the driver to take actions for energy efficiency improvement.

The exemplary embodiments aim to provide an energy efficiency management service providing server, an energy efficiency management service providing system including the server, and an energy efficiency management service providing method of the system that are configured for providing energy efficiency improvement guide based on the analysis of the energy consumption rate of the vehicle, making the driver aware of the driver's driving pattern-wise energy consumption rate.

The exemplary embodiments aims to provide an energy efficiency management service providing server, an energy efficiency management service providing system including the server, and an energy efficiency management service providing method of the system that are configured for encouraging drivers to improve energy efficiency by offering various analytical results, such as vehicle-wise analysis results and comprehensive vehicle energy efficiency analysis results within specific groups (e.g., same region, same industry, etc.).

The exemplary embodiments aims to provide an energy efficiency management service providing server, an energy efficiency management service providing system including the server, and an energy efficiency management service providing method of the system that are configured for encouraging drivers to improve energy efficiency by offering guidance for vehicles with lower energy efficiency values compared to the average energy efficiency value based on a comprehensive analysis of vehicles within a similar environment.

The technical objects of the present disclosure are not limited to the aforesaid, and other objects not described herein with may be clearly understood by those skilled in the art from the descriptions below.

To accomplish the above objects an energy efficiency management service providing server, an energy efficiency management service providing system including the server, and an energy efficiency management service providing method of the system that are configured for guiding the driver to take actions for energy efficiency improvement may be provided.

An energy efficiency management service providing server according to various exemplary embodiments of the present disclosure may include a communication module configured to communicate with external devices, and a processor operatively connected to the communication module and configured to determine per-electronic component energy consumption ratios relative to battery energy consumed over a predetermined time period based on energy efficiency-related data of a vehicle, determine a driving pattern type based on the per-electronic component energy consumption ratios, and generate an energy efficiency improvement guide based on the driving pattern type.

According to an exemplary embodiment of the present disclosure, the energy efficiency-related data may include at least one of motor operation-related energy consumption data, air conditioning-related energy consumption data, battery-related energy consumption data, and other electronic component-related energy consumption data.

According to an exemplary embodiment of the present disclosure, the processor may provide at least one of the per-electronic component energy consumption ratios and the energy efficiency improvement guide to an in-vehicle information output device or a user terminal.

According to an exemplary embodiment of the present disclosure, the energy efficiency-related data may include driving distance data and battery energy consumption data, and the processor is configured to determine an energy efficiency value based on the driving distance data and the battery energy consumption data.

According to an exemplary embodiment of the present disclosure, the processor is configured to determine, based on a motor energy consumption ratio being greater than or equal to a first threshold, whether the motor energy consumption ratio is greater than a second threshold greater than the first threshold.

According to an exemplary embodiment of the present disclosure, the processor may determine, based on the motor energy consumption ratio being greater than the second threshold, a first driving pattern type, and determine, based on the motor energy consumption ratio being less than or equal to the second threshold, second, third and fourth driving patterns based on the air conditioning device energy consumption ratio, other electronic component energy consumption ratio, and battery management device energy consumption ratio.

According to an exemplary embodiment of the present disclosure, the processor may, based on the air conditioning energy consumption ratio being less than or equal to a sum of the other electronic component energy consumption ratio and the battery management device energy consumption ratio, determine the second driving pattern type based on the other electronic component energy consumption ratio being greater than the battery management device energy consumption ratio.

Furthermore, the processor is configured to determine the third driving pattern type based on the other electronic component energy consumption ratio being less than or equal to the battery management device energy consumption ratio.

According to an exemplary embodiment of the present disclosure, the processor is configured to determine the fourth driving pattern type based on the air conditioning device energy consumption ratio being greater than the sum of the other electronic component energy consumption ratio and the battery management device energy consumption ratio.

According to an exemplary embodiment of the present disclosure, the processor may, based on the motor energy consumption ratio being less than the first threshold and the air conditioning device energy consumption ratio being less than or equal to a sum of the other electronic component energy consumption ratio and the battery management device energy consumption ratio, determine a fifth driving pattern type based on the other electronic component energy consumption ratio being greater than the battery management device energy consumption ratio.

Furthermore, the processor is configured to determine the sixth driving pattern type based on the other electronic component energy consumption ratio being less than or equal to the battery management device energy consumption ratio.

According to an exemplary embodiment of the present disclosure, the processor is configured to determine the seventh driving pattern type based on the motor energy consumption ratio being less than the first threshold and the air conditioning device energy consumption ratio being greater than the sum of the other electronic component energy consumption ratio and the battery management device energy consumption ratio.

An energy efficiency management service providing system according to various exemplary embodiments of the present disclosure may include a vehicle information providing device configured to providing energy efficiency-related data of a vehicle, and an energy efficiency management service providing server according to various exemplary embodiments of the present disclosure.

According to an exemplary embodiment of the present disclosure, the energy efficiency management service providing system may further include a control server configured to receive energy efficiency values from multiple energy efficiency management service providing server and determine an average energy efficiency value for all vehicles and an average energy efficiency value of the vehicle.

According to an exemplary embodiment of the present disclosure, the control server may be configured to determine the ranking based on the average energy efficiency value of the vehicle and provide ranking information including per-rank average energy efficiency values.

According to an exemplary embodiment of the present disclosure, the control server is configured to provide energy efficiency improvement guides for vehicles of which the average energy efficiency value is lower than the average energy efficiency value for all vehicles.

An energy efficiency management service providing method according to various exemplary embodiments of the present disclosure may include determining, at an energy efficiency management service providing server, per-electronic component energy consumption ratios relative to battery energy consumed over a predetermined time period based on energy efficiency-related data of a vehicle, determining, at the energy efficiency management service providing server, a driving pattern type based on the per-electronic component energy consumption ratios, and generating an energy efficiency improvement guide based on the driving pattern type.

According to an exemplary embodiment of the present disclosure, the determining of the per-electronic component energy consumption ratios may include determining at least one of a motor energy consumption ratio, an air conditioning device energy consumption ratio, and a battery management device energy consumption ratio.

According to an exemplary embodiment of the present disclosure, the determining of the driving pattern type may include determining the first driving pattern type based on the motor energy consumption ratio being greater than or equal to a first threshold and then greater than a second threshold greater than the first threshold.

According to an exemplary embodiment of the present disclosure, the determining of the driving pattern type may include determining, based on the motor energy consumption ratio being less than or equal to the second threshold, the second to fourth driving pattern types based on the air conditioning device energy consumption ratio, other electronic component energy consumption ratio, and battery management device energy consumption ratio.

According to an exemplary embodiment of the present disclosure, the determining of the driving pattern type may include, based on the motor energy consumption ratio being less than the first threshold and the air conditioning device energy consumption ratio being less than or equal to a sum of the other electronic component energy consumption ratio and the battery management device energy consumption ratio, determining a fifth driving pattern type based on the other electronic component energy consumption ratio being greater than the battery management device energy consumption ratio, and determining a sixth driving pattern type based on the other electronic component energy consumption ratio being less than or equal to the battery management device energy consumption ratio.

According to an exemplary embodiment of the present disclosure, the determining of the driving pattern type may include determining a seventh driving pattern type based on the air conditioning device energy consumption ratio being greater than the sum of the other electronic component energy consumption ratio and the battery management device energy consumption ratio.

According to an exemplary embodiment of the present disclosure, the energy efficiency management service providing method may further include determining, at the energy efficiency management service providing server, an energy efficiency value based on the energy efficiency-related data, and determining, at a control server, an average energy efficiency value for all vehicles and an average energy efficiency value for the vehicle based on the energy efficiency values from multiple energy efficiency management service providing servers.

Additional details regarding various embodiments of the present disclosure, beyond what has been described as solutions to the problems, are provided in the following descriptions and drawings.

According to various exemplary embodiments of the present disclosure, it is possible to provide an energy efficiency management service providing server, an energy efficiency management service providing system including the server, and an energy efficiency management service providing method of the system that are configured for guiding the driver to take actions for energy efficiency improvement.

The energy efficiency management service according to various exemplary embodiments of the present disclosure is configured for providing guidance for energy efficiency improvement based on the analysis of the energy consumption rate of the vehicle, making the driver aware of the driver's driving pattern-wise the energy consumption rate.

This can encourage the driver to operate the vehicle by adjusting the driving pattern to improve energy efficiency, leading to practical and effective energy efficiency enhancement.

The energy efficiency management service according to various exemplary embodiments of the present disclosure is configured for providing various analytical results, such as vehicle-wise analysis results and comprehensive vehicle energy efficiency analysis results within specific groups (e.g., same region, same industry, etc.).

Furthermore, the energy efficiency management service according to various exemplary embodiments of the present disclosure is configured for guidance for improving energy efficiency for vehicles with lower energy efficiency values compared to the average energy efficiency value, based on a comprehensive analysis of vehicles within a similar environment.

This can encourage the driver to operate the vehicle by adjusting their driving pattern to improve energy efficiency based on the analysis results of the energy efficiency of the vehicle, the energy efficiency analysis results of vehicles within a similar environment, and the guidance for energy efficiency improvement, allowing for practical and effective energy efficiency enhancement.

By use of the energy efficiency management service according to various exemplary embodiments of the present disclosure, it becomes possible induce changes in the driver's driving pattern, leading to practical and effective improvements in energy efficiency.

Through enhancements in energy efficiency, it becomes possible to extend the life span of the battery and maintain a state capable of exhibiting optimal performance. Additionally, it may be possible to expect cost-saving effects and a reduction in carbon dioxide (CO2) emissions.

The residual economic value of vehicles utilizing the energy efficiency management service according to various exemplary embodiments of the present disclosure may increase compared to vehicles not using the energy efficiency management service according to various exemplary embodiments of the present disclosure.

Furthermore, the energy efficiency management service according to various exemplary embodiments of the present disclosure, by providing comprehensive analysis results of energy efficiency values for vehicles within the same group (e.g., the same region, the same industry, etc.), enables the evaluation (rating) of vehicles within the same group (fleet), resulting in enhancement of operational efficiency and cost-effectiveness, particularly for businesses operating multiple vehicles, (e.g., transportation and taxi services).

The advantageous effects of the present disclosure are not limited to the aforesaid, and other effects not described herein with may be clearly understood by those skilled in the art from the descriptions below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
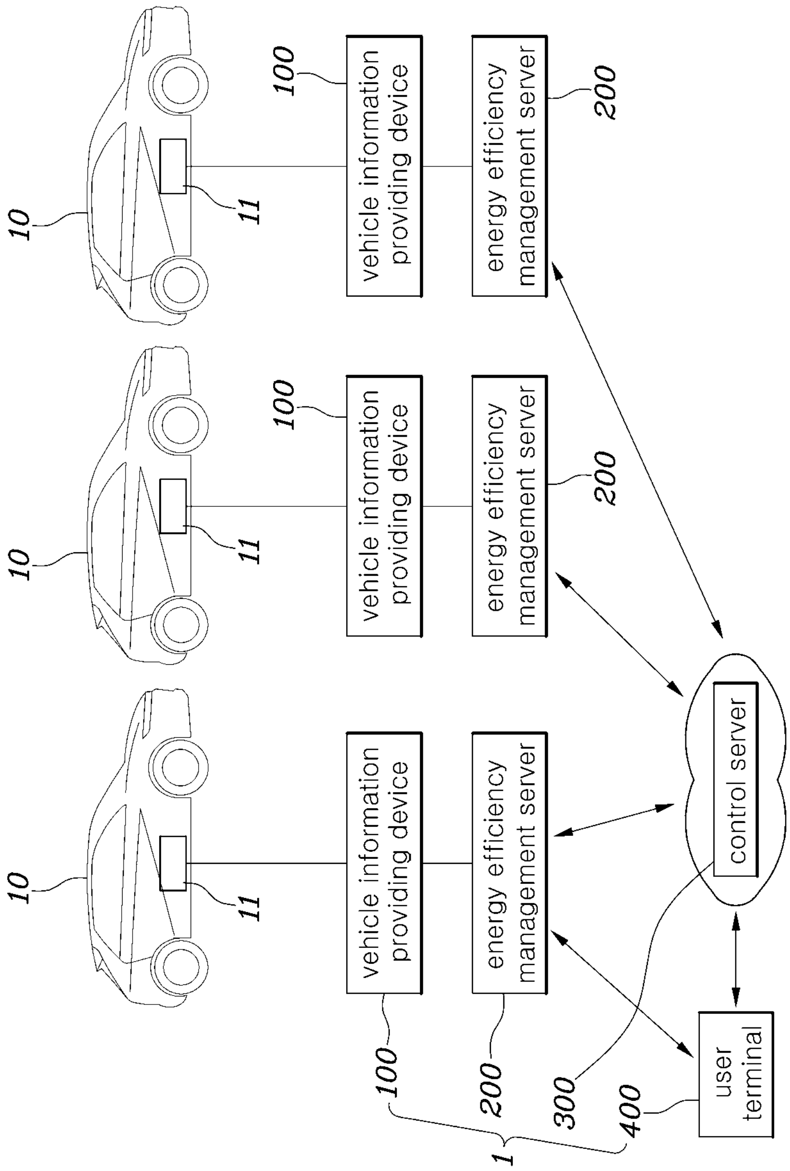
FIG. 1 is a diagram illustrating an energy efficiency management service providing system 1 according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Advantages and features of the present disclosure and methods of accomplishing the same may be understood more readily by reference to the following detailed description of embodiments and the accompanying drawings. This invention can, however, be embodied in many different forms and should not be construed as being limited to the embodiments set forth herein; rather, these embodiments are provided so that the present disclosure will be thorough and complete and will fully convey the concept of the present disclosure to those skilled in the art, and the present disclosure will only be defined by the appended claims.

The shapes, sizes, ratios, angles, numbers and the like illustrated in the drawings to describe embodiments of the present disclosure are merely exemplary, and thus, the present disclosure is not limited thereto. Throughout the specification, the same reference numerals refer to the same components. Furthermore, detailed descriptions of well-known technologies may be omitted in an exemplary embodiment of the present disclosure to avoid obscuring the subject matter of the present disclosure. In the present specification, when terms such as “includes,” “has,” and “comprises,” are used, other elements may be added unless the term “only” is used. Unless otherwise explicitly stated, when a component is expressed in the singular form, it is intended to encompass the plural form as well.

In interpreting the components, it is construed to include a margin of error even in the absence of explicit description.

When a description involves a temporal relationship, such as “later,” “subsequently,” “next,” and “before,” non-consecutive situations may also be included unless the terms “immediately” or “directly” are used.

Although the terms “first,” “second,” and the like are used for describing various components, these components are not confined by these terms. These terms are merely used for distinguishing one component from the other components. Therefore, the first component mentioned hereinafter may be the second component in the technical sense of the present disclosure.

When describing the components of the present disclosure, terms such as “first,” “second,” “A,” “B,” “(a),” and “(b)” may be used. These terms are only used only to distinguish one component from another, and the nature, sequence, order, or quantity of the corresponding components are not limited by the term. When a component is described as being “connected,” “coupled,” or “joined” to another component, it should be understood that the component may be directly connected or joined to the other component, or another component may be “interposed” between them, unless explicitly stated otherwise.

When a component is described as “at least one” it should be understood that all combinations of at least one of the related components are encompassed. For example, the phrase “at least one of the first, second, and third components” means it includes not only the first, second, or third component individually but also any combination of two or more components among the first, second, and third components.

The various features of the exemplary embodiments of the present disclosure can combined or assembled together, either partially or entirely, in a technically diverse manner, and various exemplary embodiments of the present disclosure may be independently implemented or in conjunction with related embodiments.

The exemplary embodiments of the present disclosure are described below with reference to accompanying drawings. Although depicted in a scale different from their actual scale for the convenience of explanation, the components are not limited to the scale shown in the drawing.

Hereinafter, descriptions are made of the energy efficiency management service providing server, energy efficiency management service providing system, and energy efficiency management service providing method according to the exemplary embodiments of the present disclosure with reference to accompanying drawings.

Figure 2:
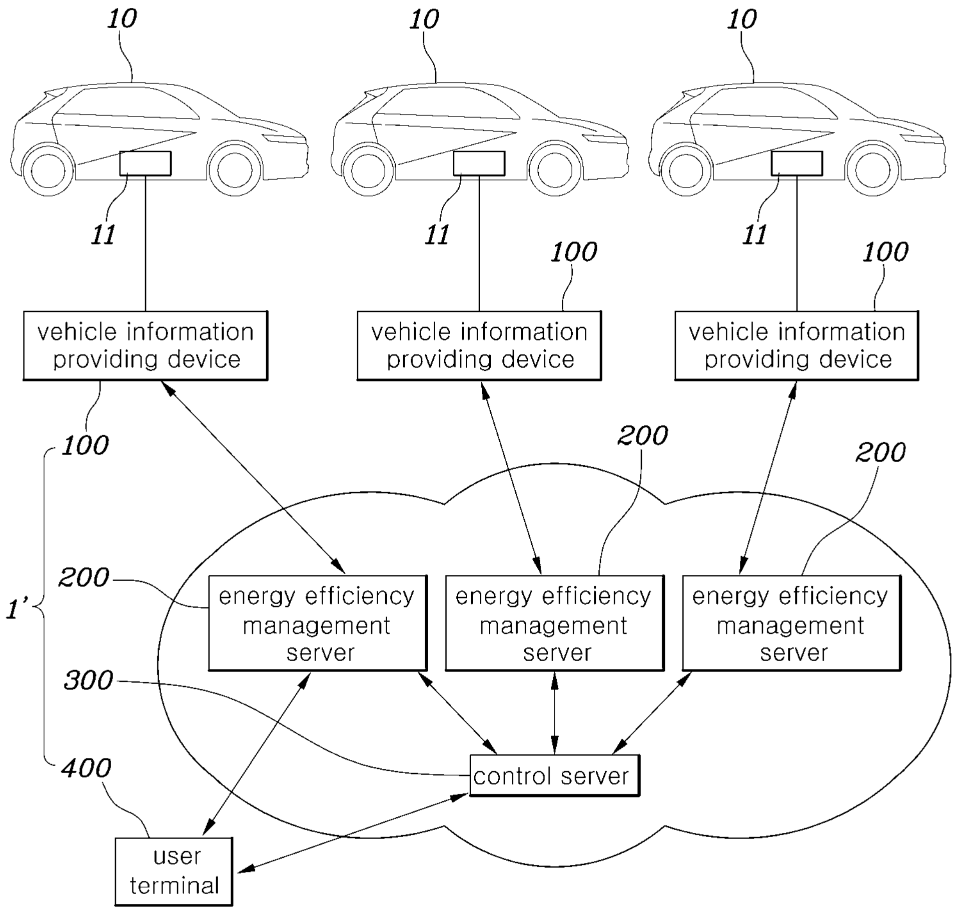
FIG. 2 is a diagram illustrating an energy efficiency management service providing system 1' according to various exemplary embodiments of the present disclosure.

FIG. 1 is a diagram illustrating an energy efficiency management service providing system 1 according to various exemplary embodiments of the present disclosure, and FIG. 2 is a diagram illustrating an energy efficiency management service providing system 1' according to various exemplary embodiments of the present disclosure.

The energy efficiency management service providing system 1 in FIG. 1 and the energy efficiency management service providing system 1' in FIG. 2 differ in terms of the location of the energy efficiency management service providing server 200, which is located in the vehicle 10 and the cloud, respectively.

According to various exemplary embodiments of the present disclosure, the energy efficiency management service providing system 1 (1') may include a vehicle information providing device 100, an energy efficiency management service providing server (hereinafter referred to as energy efficiency management server) 200, and a control server 300.

According to an exemplary embodiment of the present disclosure, the energy efficiency management service providing system 1 (1') may further include a user terminal 400.

The vehicle information providing device 100 may be provided in the vehicle 10.

In an exemplary embodiment of the present disclosure, the vehicle 10 may be provided with a motor as a power source. For example, the vehicle may be an electric vehicle (EV), a hybrid electric vehicle (HEV), a plug-in hybrid electric vehicle (PHEV), an energy cell electric vehicle (FCEV), or the like.

The vehicle information providing device 100 may provide energy efficiency-related data of the vehicle 10 to the energy efficiency management server 200.

The vehicle information providing device 100 may receive energy efficiency-related data from the vehicle control unit 11 provided in the vehicle 10 and provide the received data to the energy efficiency management server 200.

For example, the vehicle information providing device 100 may include a telematics multimedia unit (TMU) provided in the vehicle 10, and the implementation of the vehicle information providing device 100 is not limited thereto.

In an exemplary embodiment of the present disclosure, the vehicle information providing device 100 may not only provide information to external devices but may also output information provided from external devices. The vehicle information providing device 100 is configured as an information output device by outputting information from external devices.

According to an exemplary embodiment of the present disclosure, the vehicle information providing device 100 may provide data regarding the energy consumed by electronic components in the vehicle 10 (energy consumption data) to the energy efficiency management server 200.

The vehicle information providing device 100 may provide data regarding energy consumed by each electronic component over a predetermined time period to the energy efficiency management server 200.

For example, the vehicle information providing device 100 may provide data regarding energy consumed by each electronic component during a single driving cycle of the vehicle 10 to the energy efficiency management server 200.

Here, the single driving cycle may be defined based on the start-up (turning-on) and shut-down (turning-off) times of the vehicle 10.

The electronic components are devices powered by the vehicle battery, and the energy consumption of these components may affect the energy efficiency of the vehicle 10.

According to an exemplary embodiment of the present disclosure, the vehicle information providing device 100 may provide energy consumption data related to motor operation, air conditioning, battery, and other electronic components to the energy efficiency management server 200.

For example, the motor operation-related energy consumption data may include data related to energy consumed by the motors of the vehicle 10 during operation, including energy consumed by front-wheel drive motors and rear-wheel drive motors.

For example, air conditioning-related energy consumption data may include data related to energy consumed by the air conditioning system of the vehicle 10 for heating, cooling, and ventilation.

For example, battery-related energy consumption data may include data related to energy consumed for heating or cooling the high-voltage battery within the vehicle 10.

For example, other electronic component-related energy consumption data may include data related to energy consumed by electronic components other than motors, air conditioning devices, and battery-related devices (e.g., lamps, infotainment systems, black boxes, power outlets).

According to an exemplary embodiment of the present disclosure, the vehicle information providing device 100 may provide driving-related data (vehicle driving data) to the energy efficiency management server 200.

The vehicle information providing device 100 may provide vehicle driving data for a predetermined time period to the energy efficiency management server 200.

For example, the vehicle information providing device 100 may provide vehicle driving data for the duration of a single driving cycle of the vehicle 10 to the energy efficiency management server 200.

According to an exemplary embodiment of the present disclosure, vehicle driving data may include driving distance data and battery energy consumption data.

That is, the vehicle information providing device 100 may provide driving distance and battery energy consumption data for a single driving cycle of the vehicle 10 to the energy efficiency management server 200.

The energy efficiency management server 200 may be provided in the vehicle 10 (refer to FIG. 1). Alternatively, the energy efficiency management server 200 may be implemented as a cloud server deployed in the cloud (refer to FIG. 2).

The energy efficiency management server 200 may receive and store energy efficiency-related data provided by the vehicle information providing device 100.

Here, the energy efficiency-related data may include electronic components energy consumption data and vehicle driving data, which includes driving distance data and battery energy consumption data.

The energy efficiency management server 200 may be configured to determine the proportion of energy consumed by each electronic component of the vehicle in the battery energy consumed over a predetermined time period based on energy efficiency-related data.

For example, the energy efficiency management server 200 may be configured to determine the ratio of energy consumed by the motor, air conditioning system, battery heating/cooling, and other electronic components in the battery energy consumption; however, the types of electronic components subject to the determination by the energy efficiency management server 200 are not limited thereto.

Additionally, the energy efficiency management server 200 may be configured to determine the energy efficiency value of the vehicle over a predetermined time period based on the energy efficiency-related data. For example, the energy efficiency management server 200 may be configured to determine the energy efficiency value of the vehicle based on the driving distance data and battery energy consumption data.

The energy efficiency management server 200 may also determine the driving pattern type based on the energy consumption ratio of each electronic component.

For example, the energy efficiency management server 200 may be configured to determine the driving pattern type based on the energy consumption ratio of the motor, air conditioning system, battery heating/cooling device, and other electronic components; however, the types of electronic components considered for determination by the server 200 are not limited thereto.

Here, the energy consumption ratio may be defined as the percentage of energy consumed by each electronic component of the vehicle in the battery energy consumed over a predetermined time period.

Figure 3:
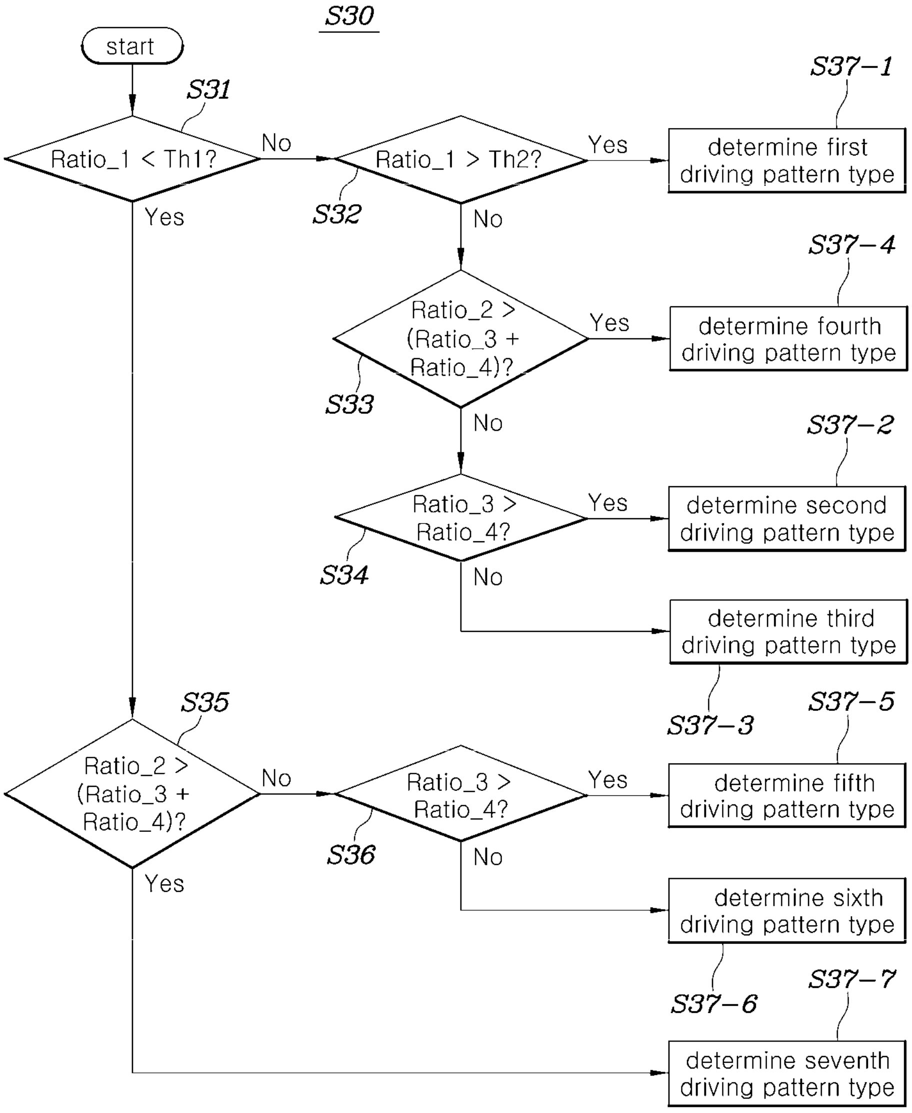
FIG. 3 is a flowchart illustrating a process S30 in which an energy efficiency management server 200 determines the driving pattern type according to various exemplary embodiments of the present disclosure.

FIG. 3 is a flowchart illustrating the process S30 in which the energy efficiency management server 200 is configured to determine the driving pattern type according to various exemplary embodiments of the present disclosure.

With reference to FIG. 3, the energy efficiency management server 200 may prioritize determining the energy consumption ratio of the motor when determining the driving pattern type.

First, the energy efficiency management server 200 may be configured to determine at step S31 whether the energy consumption ratio (Ratio_1) of the motor is less than a preset first threshold (Th1).

When the energy consumption ratio (Ratio_1) of the motor is greater than or equal to the first threshold (Th1) at step S31 (No), the energy efficiency management server 200 may, at step S32, determine whether the energy consumption ratio (Ratio_1) of the motor is greater than a preset second threshold (Th2).

When the energy consumption ratio (Ratio_1) of the motor is greater than the second threshold at step S32 (Yes), the energy efficiency management server 200 may be configured to determine the first driving pattern type at step S37-1. Here, the second threshold is greater than the first threshold.

According to an exemplary embodiment of the present disclosure, the first driving pattern type may correspond to a type in which energy consumption is mainly concentrated on driving.

For example, the energy efficiency management server 200 may be configured to generate an energy efficiency improvement guide indicating that ECO driving is activated. For example, the energy efficiency management server 200 may be configured to generate an energy efficiency improvement guide recommending restraint on sudden acceleration/deceleration and regenerative braking.

When the energy consumption ratio (Ratio_1) of the motor is less than or equal to the second threshold at step S32 (No), the energy efficiency management server 200 may be configured to determine at step S33 whether the energy consumption ratio (Ratio_2) of the air conditioning system is greater than the sum of the energy consumption ratio (Ratio_3) of other electronic components and the energy consumption ratio (Ratio_4) of the battery management device (battery cooling device/heating device).

When the energy consumption ratio (Ratio_2) of the air conditioning system is not greater than the sum of the energy consumption ratio (Ratio_3) of other electronic components and the energy consumption ratio (Ratio_4) of the battery management device (battery cooling device/heating device) at step S33 (No), the energy efficiency management server 200 may be configured to determine at step S34 whether the energy consumption ratio (Ratio_3) of other electronic components is greater than the energy consumption ratio (Ratio_4) of the battery management device (battery cooling device/heating device).

The energy efficiency management server 200 may be configured to determine the second driving pattern type at step S37-2 based on the energy consumption ratio (Ratio_3) of other electronic components being greater than the energy consumption ratio (Ratio_4) of the battery management device (battery cooling device/heating device) at step S34 (Yes), and may be configured to determine the third driving pattern type at step S37-3 based on the energy consumption ratio (Ratio_3) of other electronic components being not greater than the energy consumption ratio (Ratio_4) of the battery management device at step S34 (No).

According to an exemplary embodiment of the present disclosure, the second driving pattern type may correspond to a type in which energy consumption by other electronic components in the vehicle is high.

For example, the energy efficiency management server 200 may be configured to generate an energy efficiency improvement guide indicating that the energy consumption by other electronic components in the vehicle is high. For example, the energy efficiency management server 200 may be configured to generate an energy efficiency improvement guide recommending power-saving for unused other electronic components in the vehicle. For example, the energy efficiency management server 200 may be configured to generate an energy efficiency improvement guide providing information related to other electronic components with high energy consumption.

According to an exemplary embodiment of the present disclosure, the third driving pattern type may correspond to a type in which the vehicle actively intervenes to maintain optimal battery performance.

For example, the energy efficiency management server 200 may be configured to generate an energy efficiency improvement guide indicating that energy consumption was high for thermal management to enhance the lifespan and performance of the battery.

On the other hand, when the energy consumption ratio (Ratio_2) of the air conditioning system is greater than the sum of the energy consumption ratio (Ratio_3) of other electronic components and the energy consumption ratio (Ratio_4) of the battery management device (battery cooling device/heating device) at step S33 (Yes), the energy efficiency management server 200 may be configured to determine the fourth driving pattern type at step S37-4.

According to an exemplary embodiment of the present disclosure, the fourth driving pattern type may correspond to a type in which energy efficiency is improved through efficient use of the air conditioning system.

For example, the energy efficiency management server 200 may be configured to generate an energy efficiency improvement guide indicating that there has been high energy consumption in the use of the air conditioning system. For example, the energy efficiency management server 200 may be configured to generate an energy efficiency improvement guide indicating that energy efficiency may be enhanced through the efficient use of the air conditioning system.

When the energy consumption ratio (Ratio_1) of the motor is less than the first threshold (Th1) at step S31 (Yes), the energy efficiency management server 200 may be configured to determine at step S35 whether the energy consumption ratio (Ratio_2) of the air conditioning system is greater than the sum of the energy consumption ratio (Ratio_3) of other electronic components and the energy consumption ratio (Ratio_4) of the battery management device (battery cooling device/heating device).

When the energy consumption ratio (Ratio_2) of the air conditioning system is determined not to be greater than the sum of the energy consumption ratio (Ratio_3) of other electronic components and the energy consumption ratio (Ratio_4) of the battery management device (battery cooling device/heating device) at step S35 (No), the energy efficiency management server 200 may be configured to determine at step S36 whether the energy consumption ratio (Ratio_3) of other electronic components is greater than the energy consumption ratio (Ratio_4) of the battery management device (battery cooling device/heating device).

The energy efficiency management server 200 may be configured to determine the fifth driving pattern type at step S37-5 based on the energy consumption ratio (Ratio_3) of other electronic components being greater than the energy consumption ratio (Ratio_4) of the battery management device (battery cooling device/heating device) at step S36 (Yes), and may be configured to determine the sixth driving pattern type at step S37-6 based on the energy consumption ratio (Ratio_3) of other electronic components being not greater than the energy consumption ratio (Ratio_4) of the battery management device at step S36 (No).

According to an exemplary embodiment of the present disclosure, the fifth driving pattern type may correspond to a type in which energy consumption by other electronic components in the vehicle is high.

For example, the energy efficiency management server 200 may be configured to generate an energy efficiency improvement guide indicating that the energy consumption by other electronic components in the vehicle is high. For example, the energy efficiency management server 200 may be configured to generate an energy efficiency improvement guide recommending power-saving for unused other electronic components in the vehicle. For example, the energy efficiency management server 200 may be configured to generate an energy efficiency improvement guide providing information related to other electronic components with high energy consumption while recommending reducing the usage proportion of those other electronic components. According to an exemplary embodiment of the present disclosure, the sixth driving pattern type may correspond to a type in which the vehicle actively intervenes to maintain optimal battery performance.

For example, the energy efficiency management server 200 may be configured to generate a guide indicating that energy consumption is high for heat management aimed at improving the lifespan and performance of the battery. For example, the energy efficiency management server 200 may be configured to generate a guide recommending restraint on sudden acceleration/deceleration for energy efficiency improvement.

On the other hand, when the energy consumption ratio (Ratio_2) of the air conditioning system is greater than the sum of the energy consumption ratio (Ratio_3) of other electronic components and the energy consumption ratio (Ratio_4) of the battery management device (battery cooling device/heating device) at step S35 (Yes), the energy efficiency management server 200 may be configured to determine the seventh driving pattern type at step S37-7.

According to an exemplary embodiment of the present disclosure, the seventh driving pattern type may correspond to a type in which energy consumption is high due to the use of the air conditioning system.

For example, the energy efficiency management server 200 may be configured to generate an energy efficiency improvement guide indicating that energy consumption is high due to the use of the air conditioning system. For example, the energy efficiency management server 200 may be configured to generate an energy efficiency improvement guide recommending appropriate temperature settings for the air conditioning system and turning off the power when unnecessary.

The energy efficiency management server 200 may provide the per-electronic component energy consumption ratios, energy efficiency values, and energy efficiency improvement guides to the vehicle information providing device 100, allowing the vehicle information providing device 100 to display the per-electronic component energy consumption ratios, energy efficiency values, and energy efficiency improvement guides.

Furthermore, the energy efficiency management server 200 may provide the per-electronic component energy consumption ratios, energy efficiency values, and energy efficiency improvement guides to the user terminal 400.

Figure 4:
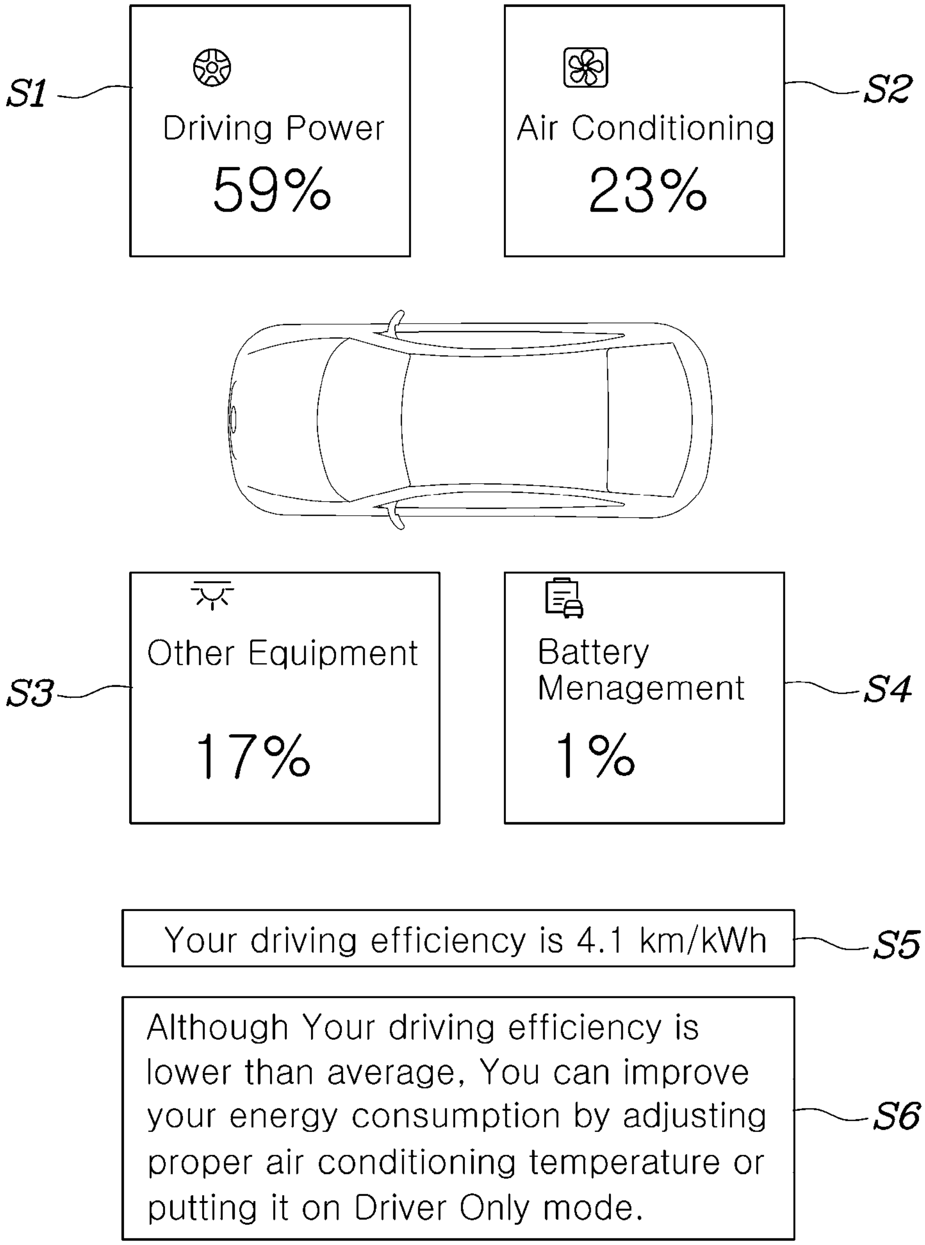
FIG. 4 is a diagram illustrating a screen displayed by a vehicle information providing device 100 according to various exemplary embodiments of the present disclosure.

FIG. 4 is a diagram illustrating a screen displayed by a vehicle information providing device 100 according to various exemplary embodiments of the present disclosure.

As shown in FIG. 4, the vehicle information providing device 100 may display the energy consumption ratios of respective electronic components relative to the battery energy consumption in the energy consumption ratio display areas S1, S2, S3 and S4, the energy efficiency value in the energy efficiency value display area S5, and the energy efficiency improvement guide in the energy efficiency improvement guide display area S6.

According to an exemplary embodiment of the present disclosure, the vehicle information providing device 100 may provide the energy consumption ratios of respective electronic components, the energy efficiency improvement guide to the vehicle control unit 11 to allow the vehicle control unit 11 to control the operation of the vehicle to improve energy efficiency.

According to an exemplary embodiment of the present disclosure, the energy efficiency management server 200 may provide the energy efficiency value of the vehicle 10 to the control server 300.

The control server 300 may be a cloud server implemented in the cloud.

The control server 300 may receive energy efficiency values for the vehicle 10 from multiple energy efficiency management servers 200.

According to an exemplary embodiment of the present disclosure, the control server 300 may receive energy efficiency values for each vehicle from multiple energy efficiency management servers 200 and determine the average energy efficiency value for all vehicles and the average energy efficiency values for each vehicle over a predetermined time period. Here, the average energy efficiency value may mean an average of all energy efficiency values provided from the vehicles.

The control server 300 may be configured to determine the ranking of vehicles based on the average energy efficiency values for each vehicle, in descending order of the average.

For example, the control server 300 may be configured to determine the average energy efficiency value for all vehicles, the average energy efficiency value for each vehicle, the ranking of vehicles, based on a 30-day period.

For example, the control server 300 may be implemented to provide energy efficiency management services for vehicles within the same group (e.g., the same region, the same industry, etc.).

To achieve this, the control server 300 may receive and register regional information, industry information, etc., from users who want to subscribe to the services provided as in the present disclosure.

According to an exemplary embodiment of the present disclosure, the control server 300 may be configured to determine the top-percentage of the vehicle based on the ranking of vehicles.

The control server 300 may provide the vehicle 10 with the average energy efficiency value for all vehicles, the average energy efficiency value for the vehicle, and the average energy efficiency value for the top-ranked (rank 1) vehicle for a specific period (e.g., 1 day, 1 month, etc.).

For example, the control server 300 may provide the driving distance used to determine the average energy efficiency value for the vehicle as a reference value.

The control server 300 may provide the energy efficiency management server 200 with the average energy efficiency value for all vehicles, the average energy efficiency value for the vehicle, and the average energy efficiency value for the top-ranked (rank 1) vehicle for a specific period (e.g., 1 day, 1 month, etc.). Furthermore, the energy efficiency management server 200 may provide the vehicle information providing device 100 with the average energy efficiency value for all vehicles, the average energy efficiency value for the vehicle, and the average energy efficiency value for the top-ranked (rank 1) vehicle.

According to an exemplary embodiment of the present disclosure, the control server 300 may provide the vehicle information providing device 100 of the vehicle 10 with the average energy efficiency value for all vehicles, the average energy efficiency value for the vehicle, and the average energy efficiency value for the top-ranked (rank 1) vehicle for a specific period (e.g., 1 day, 1 month, etc.).

The control server 300 may provide ranking information listing vehicles in descending order based on the average energy efficiency values. The ranking information may include per-rank energy efficiency values and the driving distance used to determine the average energy efficiency value.

The control server 300 may provide the top percentage of the vehicle determined based on the ranking of vehicles.

The control server 300 may be configured to generate and provide energy efficiency improvement guides for vehicles of which the average energy efficiency value is lower than the average energy efficiency value for all vehicles.

The control server 300 may provide the user terminal 400 with information such as the average energy efficiency value for all vehicles, the average energy efficiency value for the user's vehicle, the average energy efficiency value for the top-ranked (rank 1) vehicle, ranking information, top-ratio information, and energy efficiency improvement guides.

Figure 5A:
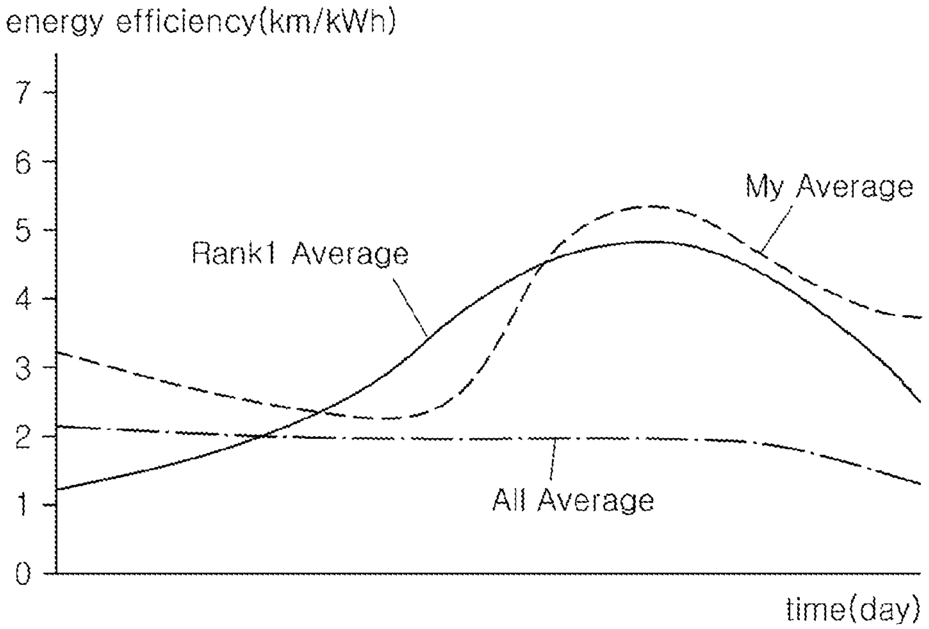
FIG. 5A is a graph displaying the average energy efficiency value for all vehicles, the average energy efficiency value for the vehicle, and the average of the energy efficiency values for the top-ranked vehicle.
Figure 5B:
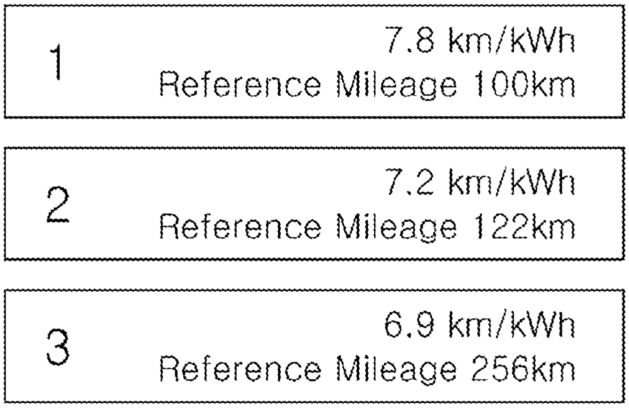
FIG. 5B illustrates ranking information based on the vehicle-specific average energy efficiency values managed by the control server 300.
Figure 5C:
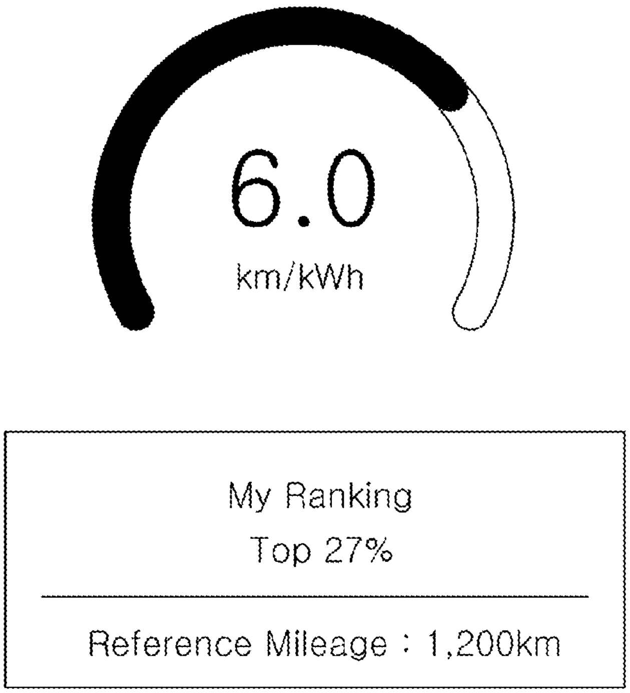
FIG. 5C illustrates the top percentage information of the vehicle.

FIG. 5A, FIG. 5B, and FIG. 5C are diagrams illustrating a screen displayed by a vehicle information providing device 100 according to various exemplary embodiments of the present disclosure.

FIG. 5A is a graph displaying the average energy efficiency value for all vehicles, the average energy efficiency value for the vehicle, and the average of the energy efficiency values for the top-ranked vehicle, FIG. 5B illustrates ranking information based on the vehicle-specific average energy efficiency values managed by the control server 300, and FIG. 5C illustrates the top percentage information of the vehicle.

As shown in FIG. 5A, FIG. 5B, and FIG. 5C, the vehicle information providing device 100 may output the information received from the energy efficiency management server 200 or the control server 300.

Figure 6:
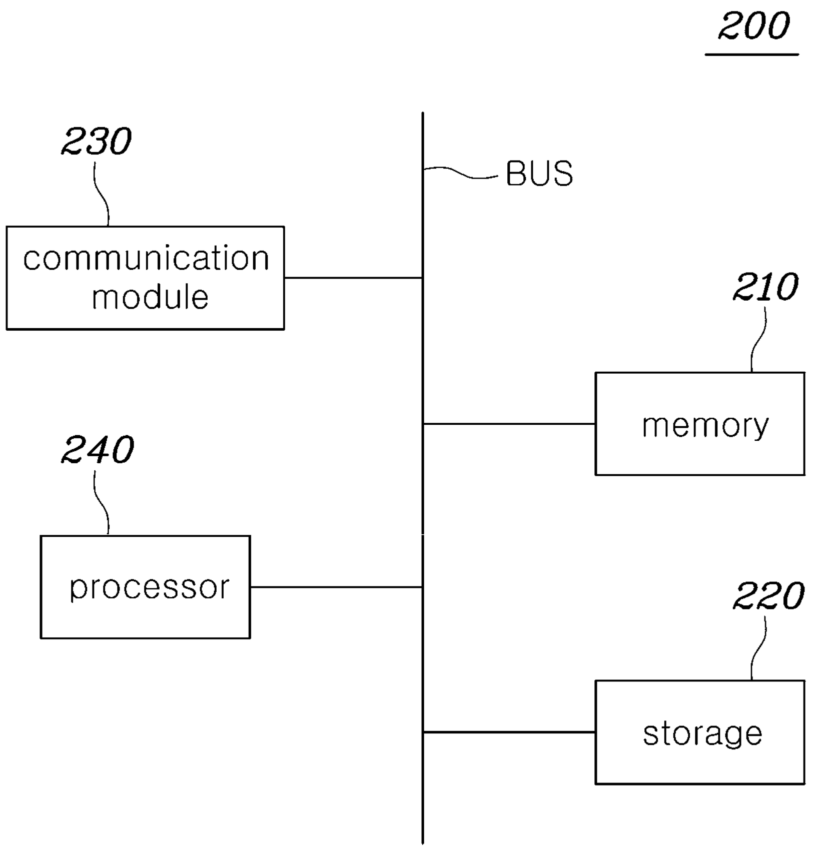
FIG. 6 is a diagram illustrating a configuration of an energy efficiency management server 200 according to various exemplary embodiments of the present disclosure.

FIG. 6 is a diagram illustrating a configuration of an energy efficiency management server 200 according to various exemplary embodiments of the present disclosure.

With reference to FIG. 6, the energy efficiency management server 200 may include a memory 210, a storage 120, a communication module 230, and a processor 240, but the configuration of the energy efficiency management server 200 is not limited thereto.

The processor 240 may be connected to the memory 210, the storage 220, and the communication module 230 through an internal bus.

The memory 210 may store various algorithms, data, and other information necessary for the operation of the processor 240.

The memory 210 may include volatile memory and/or non-volatile memory. The volatile memory may include dynamic random access memory (DRAM), static RAM (SRAM), synchronous DRAM (SDRAM), phase-change RAM (PRAM), magnetic RAM (MRAM), resistive RAM (RRAM), and ferroelectric RAM (FeRAM). The non-volatile memory may include read-only memory (ROM), programmable ROM (PROM), electrically programmable ROM (EPROM), electrically erasable programmable ROM (EEPROM), and flash memory.

The storage 220 may store data obtained while the processor 240 is operating. For example, the storage 220 may include media such as Hard Disk Drive (HDD), solid-state disk (SSD), embedded multimedia card (eMMC), and universal flash storage (UFS).

The storage 220 may store data or information obtained or generated by the processor 240 during the energy efficiency management operation.

The communication module 230 may transmit and receive information through communication with external devices and relay the received information to the processor 240.

The communication module 230 may receive information from the vehicle information providing device 100 or the control server 300, relay the received information to the processor 240, and transmit the information received from the processor 240 to the vehicle information providing device 100, the control server 300, or the user terminal 400.

The communication module 230 may be a hardware device implemented by various electronic circuits, e.g., processor, transceiver, etc., to transmit and receive signals via wireless or wired connections.

The communication module may be a hardware device implemented with various electronic circuits to transmit and receive signals via wireless or wired connections and may include Controller Area Network (CAN) communication and/or Local Interconnect Network (LIN) communication. Furthermore, the communication module may include a wired communication module (e.g., a power line communication module) and/or a wireless communication module (e.g., a cellular communication module, a Wi-Fi communication module, a short-range wireless communication module, and/or a global navigation satellite system (GNSS) communication module) and the like.

The processor 240 may execute operations or data processing related to the control of at least one other component of the energy efficiency management server 200. For example, the processor 240 may execute algorithms stored in the memory 210.

The processor 240 be implemented as a hardware data processing device with a circuit including a physical structure to execute desired operations. For example, the desired operations may encompass codes or instructions included in the program.

For example, the hardware-implemented data processing device may encompass microprocessors, central processing units (CPUs), processor cores, multi-core processors, multiprocessors, application-specific integrated circuits (ASICs), and field programmable gate arrays (FPGAs).

The processor 240 may be configured to determine the energy consumption ratio and energy efficiency value for each electronic component based on the energy efficiency-related data provided by the vehicle information providing device 100.

The processor 240 may be configured to determine the ratio of energy consumed by the motor, air conditioner, battery heating/cooling, and other electric devices, relative to the overall energy consumption from the battery.

The processor 240 may be configured to determine the driving pattern type based on the energy consumption ratio of each electronic component.

The processor 240 may be configured to determine the driving pattern type based on the energy consumption ratio of the motor, air conditioning system, battery heating/cooling device, and other electronic components.

The processor 240 may be configured to generate energy efficiency improvement guides based on the driving pattern type.

Figure 7:
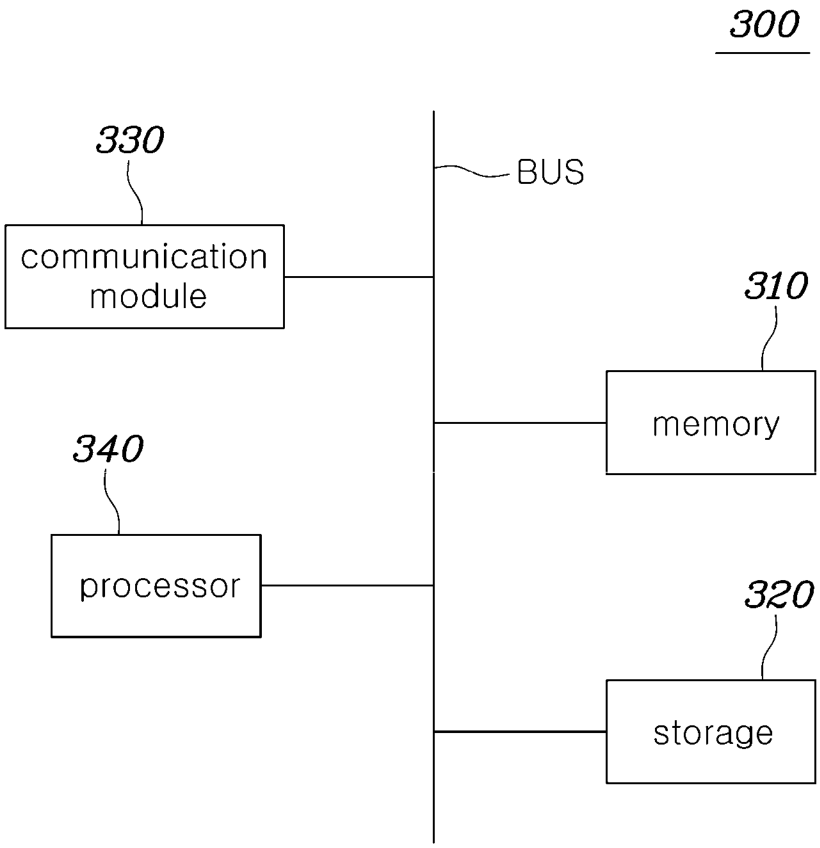
FIG. 7 is a diagram illustrating a configuration of a control server 300 according to various exemplary embodiments of the present disclosure.

FIG. 7 is a diagram illustrating a configuration of a control server 300 according to various exemplary embodiments of the present disclosure.

With reference to FIG. 7, the control server 300 may include a memory 310, a storage 320, a communication module 330, and a processor 340, the configuration of the control server 300 is not limited thereto.

The processor 340 may be connected to the memory 310, the storage 320, and the communication module 330 through an internal bus.

The memory 310 may store various algorithms, data, and other information necessary for the operation of the processor 340.

The storage 320 may store data obtained while the processor 340 is operating. For example, the storage 320 may include media such as Hard Disk Drive (HDD), solid-state disk (SSD), embedded multimedia card (eMMC), and universal flash storage (UFS).

The storage 320 may store data or information obtained or generated by the processor 340 during the energy efficiency management operation.

The communication module 330 may transmit and receive information through communication with external devices and relay the received information to the processor 340.

The communication module 330 may receive information from the energy efficiency management server 200, relay the received information to the processor 340, and transmit the information received from the processor 340 to the vehicle information providing device 100, the energy efficiency management server 200, or the user terminal 400.

The communication module 330 may be a hardware device implemented by various electronic circuits, e.g., processor, transceiver, etc., to transmit and receive signals via wireless or wired connections.

The communication module may be a hardware device implemented with various electronic circuits to transmit and receive signals via wireless or wired connections and may include Controller Area Network (CAN) communication and/or Local Interconnect Network (LIN) communication. Furthermore, the communication module may include a wired communication module (e.g., a power line communication module) and/or a wireless communication module (e.g., a cellular communication module, a Wi-Fi communication module, a short-range wireless communication module, and/or a global navigation satellite system (GNSS) communication module) and the like.

The processor 340 may execute operations or data processing related to the control of at least one other component of the control server 300. For example, the processor 340 may execute algorithms stored in the memory 310.

The processor 340 be implemented as a hardware data processing device with a circuit including a physical structure to execute desired operations. For example, the desired operations may encompass codes or instructions included in the program.

The processor 340 may receive energy efficiency values for each vehicle from multiple energy efficiency management servers 200 and determine the average of the energy efficiency values for all vehicles and the average of the energy efficiency values for each vehicle.

The processor 340 may be configured to determine the ranking of vehicles based on the average energy efficiency values for each vehicle, in descending order of the average.

The processor 340 may be configured to determine the top percentage of the vehicle based on the ranking of vehicles.

Figure 8:
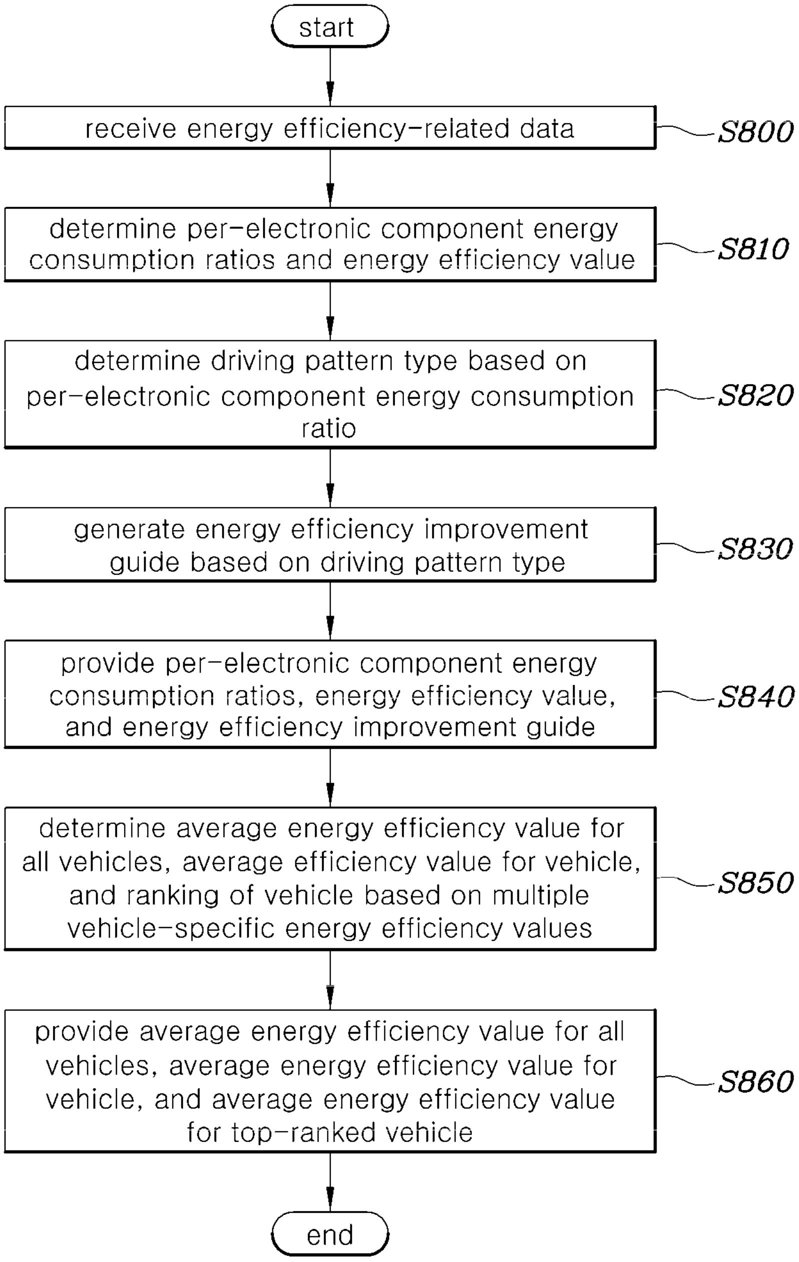
FIG. 8 is a flowchart illustrating an energy efficiency management service providing method according to various exemplary embodiments of the present disclosure.

FIG. 8 is a flowchart illustrating an energy efficiency management service providing method according to various exemplary embodiments of the present disclosure.

The operations illustrated in FIG. 8 may be performed by the energy efficiency management service providing systems 1 (1') described with reference to FIGS. 1 to 7.

With reference to FIG. 1, FIG. 2, FIG. 3, FIG. 4, FIG. 5, FIG. 6, FIG. 7, and FIG. 8, the energy efficiency management server 200 may receive energy efficiency-related data from the vehicle information providing device 100 at step S800.

In an exemplary embodiment of the present disclosure, the energy efficiency-related data may include electronic component energy consumption data and vehicle driving data.

The electronic component energy consumption data may refer to data regarding the energy consumed by each electronic component during a single driving cycle of the vehicle 10, and the single driving cycle may be defined based on the start-up (turning-on) and shut-down (turning-off) times of the vehicle 10.

In an exemplary embodiment of the present disclosure, the electronic component energy consumption data may include energy consumption data related to motor operation, air conditioning, battery, and other electronic components.

In an exemplary embodiment of the present disclosure, vehicle driving data may include driving distance data and battery energy consumption data.

The energy efficiency management server 200 may be configured to determine the energy consumption ratios and energy efficiency values for respective electronic components based on the energy efficiency-related data at step S810.

At step S810, the energy efficiency management server 200 may be configured to determine the ratio of energy consumed by the motor, air conditioning system, battery heating/cooling, and other electronic components in the battery energy consumption.

The energy efficiency management server 200 may also determine the driving pattern type based on the energy consumption ratio of each electronic component at step S820.

At step S820, the energy efficiency management server 200 may be configured to determine the driving pattern type based on the energy consumption ratio of the motor, air conditioning system, battery heating/cooling device, and other electronic components.

The energy efficiency management server 200 may be configured to generate an energy efficiency improvement guide based on the driving pattern type at step S830.

The energy efficiency management server 200 may provide the per-electronic component energy consumption ratios, energy efficiency values, and energy efficiency improvement guides to the vehicle information providing device 100 at step S840, allowing the vehicle information providing device 100 to output the information as shown in FIG. 4.

At step S840, the energy efficiency management server 200 may also provide the per-electronic component energy consumption ratios, energy efficiency values, and energy efficiency improvement guides to the user terminal 400.

The above-described steps S800 to S840 may be performed by the energy efficiency management server 200.

With the inclusion of the control server 300 in the energy efficiency management service providing system 1 (1'), the following steps may be additionally performed.

According to an exemplary embodiment of the present disclosure, multiple energy efficiency management servers 200 may each provide the energy efficiency value of the vehicle 10 to the control server 300.

Accordingly, the control server 300 may receive energy efficiency values for each vehicle from the multiple energy efficiency management servers 200 and determine the average energy efficiency values for all vehicles and the average energy efficiency values for the vehicle at step S850.

At step S850, the control server 300 may be configured to determine the ranking of vehicles based on the average energy efficiency values for each vehicle, in descending order of the average.

For example, the control server 300 may be configured to determine the average energy efficiency value for all vehicles, the average energy efficiency value for each vehicle, the ranking of vehicles, based on a 30-day period.

For example, the control server 300 may be implemented to provide energy efficiency management services for vehicles within the same group (e.g., the same region, the same industry, etc.).

To achieve this, the control server 300 may receive and register regional information, industry information, etc., from users who want to subscribe to the services provided as in the present disclosure.

At step S850, the control server 300 may be configured to determine the top-percentage of the vehicle based on the ranking of vehicles.

At step S860, the control server 300 may provide the vehicle 10 with the average energy efficiency value for all vehicles, the average energy efficiency value for the vehicle, and the average energy efficiency value for the top-ranked (rank 1) vehicle for a specific period (e.g., 1 day, 1 month, etc.).

At step S860, the control server 300 may provide the driving distance used to determine the average energy efficiency value for the vehicle as a reference value.

At step S860, the control server 300 may provide the energy efficiency management server 200 of the vehicle 10 with the average energy efficiency value for all vehicles, the average energy efficiency value for the vehicle, and the average energy efficiency value for the top-ranked (rank 1) vehicle for a specific period (e.g., 1 day, 1 month, etc.).

The energy efficiency management server 200 may provide the vehicle information providing device 100 with the information received from the control server 300, allowing the vehicle information providing device 100 to output the information as shown in FIG. 5A, FIG. 5B, and FIG. 5C.

According to an exemplary embodiment of the present disclosure, the control server 300 may provide the vehicle information providing device 100 of the vehicle 10 with the average energy efficiency value for all vehicles, the average energy efficiency value for the vehicle, and the average energy efficiency value for the top-ranked (rank 1) vehicle for a specific period (e.g., 1 day, 1 month, etc.).

According to an exemplary embodiment of the present disclosure, the control server 300 may provide the user terminal 400 with the average energy efficiency value for all vehicles, the average energy efficiency value for the vehicle, and the average energy efficiency value for the top-ranked (rank 1) vehicle for a specific period (e.g., 1 day, 1 month, etc.).

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

In the present specification, unless stated otherwise, a singular expression includes a plural expression unless the context clearly indicates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An energy efficiency management service providing server comprising:

a communication module configured to communicate with external devices; and a processor operatively connected to the communication module and configured to determine per-electronic component energy consumption ratios relative to battery energy consumed over a predetermined time period based on energy efficiency-related data of a vehicle, determine a driving pattern based on the per-electronic component energy consumption ratios, and generate an energy efficiency improvement guide based on the driving pattern, wherein the per-electronic component energy consumption ratios include a motor energy consumption ratio, an air conditioning device energy consumption ratio, a battery management device energy consumption ratio, and other electronic component energy consumption ratio, and wherein the processor is further configured determine the driving pattern based on the motor energy consumption ratio, the air conditioning device energy consumption ratio, the battery management device energy consumption ratio, the other electronic component energy consumption ratio.

2. The energy efficiency management service providing server of claim 1, wherein the energy efficiency-related data includes motor operation-related energy consumption data, air conditioning-related energy consumption data, battery-related energy consumption data, and other electronic component-related energy consumption data.

3. The energy efficiency management service providing server of claim 1, wherein the processor is further configured to provide at least one of the per-electronic component energy consumption ratios and the energy efficiency improvement guide to an in-vehicle information output device or a user terminal.

4. The energy efficiency management service providing server of claim 1, wherein the energy efficiency-related data includes driving distance data and battery energy consumption data, and the processor is further configured to determine an energy efficiency value based on the driving distance data and the battery energy consumption data.

5. The energy efficiency management service providing server of claim 2, wherein the driving pattern includes first, second, third and fourth driving patterns, and wherein the processor is further configured determine, based on the motor energy consumption ratio being greater than or equal to a first threshold, whether the motor energy consumption ratio is greater than a second threshold greater than the first threshold, determine, based on the motor energy consumption ratio being greater than the second threshold, the first driving pattern, and determine, based on the motor energy consumption ratio being less than or equal to the second threshold, the second, third and fourth driving patterns based on the air conditioning device energy consumption ratio, the other electronic component energy consumption ratio, and the battery management device energy consumption ratio.

6. The energy efficiency management service providing server of claim 5, wherein the processor is further configured to, based on the air conditioning energy consumption ratio being less than or equal to a sum of the other electronic component energy consumption ratio and the battery management device energy consumption ratio, determine the second driving pattern based on the other electronic component energy consumption ratio being greater than the battery management device energy consumption ratio, and determine the third driving pattern based on the other electronic component energy consumption ratio being less than or equal to the battery management device energy consumption ratio.

7. The energy efficiency management service providing server of claim 5, wherein the processor is further configured to determine the fourth driving pattern based on the air conditioning device energy consumption ratio being greater than the sum of the other electronic component energy consumption ratio and the battery management device energy consumption ratio.

8. The energy efficiency management service providing server of claim 5, wherein the driving pattern includes fifth and sixth driving patterns, and wherein the processor is further configured to, based on the motor energy consumption ratio being less than the first threshold and the air conditioning device energy consumption ratio being less than or equal to a sum of the other electronic component energy consumption ratio and the battery management device energy consumption ratio, determine the fifth driving pattern based on the other electronic component energy consumption ratio being greater than the battery management device energy consumption ratio, and determine the sixth driving pattern based on the other electronic component energy consumption ratio being less than or equal to the battery management device energy consumption ratio.

9. The energy efficiency management service providing server of claim 5, wherein the driving pattern includes a seventh driving pattern, and wherein the processor is further configured to determine the seventh driving pattern based on the motor energy consumption ratio being less than the first threshold and the air conditioning device energy consumption ratio being greater than a sum of the other electronic component energy consumption ratio and the battery management device energy consumption ratio.

10. An energy efficiency management service providing system comprising:

a vehicle information providing device configured to providing energy efficiency-related data of a vehicle; and an energy efficiency management service providing server, and wherein the energy efficiency management service providing serves includes:

a communication module configured to communicate with external devices; and a processor operatively connected to the communication module and configured to determine per-electronic component energy consumption ratios relative to battery energy consumed over a predetermined time period based on energy efficiency-related data of a vehicle, determine a driving pattern based on the per-electronic component energy consumption ratios, and generate an energy efficiency improvement guide based on the driving pattern, wherein the per-electronic component energy consumption ratios includes a motor energy consumption ratio, an air conditioning device energy consumption ratio, a battery management device energy consumption ratio, and other electronic component energy consumption ratio, and wherein the processor is further configured determine the driving pattern based on the motor energy consumption ratio, the air conditioning device energy consumption ratio, the battery management device energy consumption ratio, the other electronic component energy consumption ratio.

11. The energy efficiency management service providing system of claim 10, further including a control server configured to receive energy efficiency values from multiple energy efficiency management service providing server and determine an average energy efficiency value for vehicles and an average energy efficiency value of the vehicle.

12. The energy efficiency management service providing system of claim 11, wherein the control server is further configured to determine a ranking based on the average energy efficiency value of the vehicle and provide ranking information including per-rank average energy efficiency values.

13. The energy efficiency management service providing system of claim 11, wherein the control server is further configured to provide energy efficiency improvement guides for vehicles of which the average energy efficiency value is lower than the average energy efficiency value for the vehicles.

14. An energy efficiency management service providing method comprising:

determining, at an energy efficiency management service providing server, per-electronic component energy consumption ratios relative to battery energy consumed over a predetermined time period based on energy efficiency-related data of a vehicle;

determining, at the energy efficiency management service providing server, a driving pattern based on the per-electronic component energy consumption ratios; and generating, at the energy efficiency management service providing server, an energy efficiency improvement guide based on the driving pattern, wherein the determining of the per-electronic component energy consumption ratios includes determining a motor energy consumption ratio, an air conditioning device energy consumption ratio, and a battery management device energy consumption ratio, and wherein the determining a driving pattern based on the per-electronic component energy consumption ratios includes determining the driving pattern based on the motor energy consumption ratio, the air conditioning device energy consumption ratio, the battery management device energy consumption ratio, the other electronic component energy consumption ratio.

15. The energy efficiency management service providing method of claim 14, wherein the driving pattern includes a first driving pattern, and wherein the determining of the driving pattern includes determining, based on the motor energy consumption ratio being greater than or equal to a first threshold, whether the motor energy consumption ratio is greater than a second threshold greater than the first threshold, determine, based on the motor energy consumption ratio being greater than the second threshold, the first driving pattern.

16. The energy efficiency management service providing method of claim 15, wherein the driving pattern includes second, third and fourth driving patterns, and wherein the determining of the driving pattern includes determining, based on the motor energy consumption ratio being less than or equal to the second threshold, the second, third and fourth driving patterns based on the air conditioning device energy consumption ratio, the other electronic component energy consumption ratio, and the battery management device energy consumption ratio.

17. The energy efficiency management service providing method of claim 16, wherein the driving pattern includes fifth and sixth driving patterns, and wherein the determining of the driving pattern includes, based on the motor energy consumption ratio being less than the first threshold and the air conditioning device energy consumption ratio being less than or equal to a sum of the other electronic component energy consumption ratio and the battery management device energy consumption ratio, determining the fifth driving pattern based on the other electronic component energy consumption ratio being greater than the battery management device energy consumption ratio, and determining the sixth driving pattern based on the other electronic component energy consumption ratio being less than or equal to the battery management device energy consumption ratio.

18. The energy efficiency management service providing method of claim 16, wherein the driving pattern includes a seventh driving pattern, and wherein the determining of the driving pattern includes determining the seventh driving pattern based on the air conditioning device energy consumption ratio being greater than a sum of the other electronic component energy consumption ratio and the battery management device energy consumption ratio.

19. The energy efficiency management service providing method of claim 14, further including:

determining, at the energy efficiency management service providing server, an energy efficiency value based on the energy efficiency-related data; and determining, at a control server, an average energy efficiency value for vehicles and an average energy efficiency value for the vehicle based on the energy efficiency values from multiple energy efficiency management service providing servers.

* * * * *